No. 866,921. PATENTED SEPT. 24, 1907.
W. O. DUNTLEY.
LUBRICATOR.
APPLICATION FILED OCT. 6, 1904.

WITNESSES
J. Francis Small
Louis B. Erwin

INVENTOR
William O. Duntley
BY
Rector & Hibben
His ATTORNEYS

UNITED STATES PATENT OFFICE.

WILLIAM O. DUNTLEY, OF CHICAGO, ILLINOIS, ASSIGNOR TO CHICAGO PNEUMATIC TOOL COMPANY, OF CHICAGO, ILLINOIS, A CORPORATION OF NEW JERSEY.

LUBRICATOR.

No. 866,921.　　　Specification of Letters Patent.　　　Patented Sept. 24, 1907.

Application filed October 6, 1904. Serial No. 227,477.

*To all whom it may concern:*

Be it known that I, WILLIAM O. DUNTLEY, residing at Chicago, Cook county, Illinois, have invented certain new and useful Improvements in Lubricators, of which the following is a specification.

My invention relates to lubricators and is more particularly intended for use in connection with pneumatic tools such as pneumatic hammers to which air under pressure is conducted or supplied by means of a flexible hose.

The object of my invention is to provide simple, reliable and efficient means for properly lubricating the pneumatic tool or hammer or the like by automatically supplying oil to the air or other motive fluid, and to this end and according to my present invention I arrange such means in the flexible hose or supply pipe in such manner that the oil is supplied to the air in the form of a spray and in an automatic manner inasmuch as the supply of the oil is dependent upon the passage of air pressure through the hose or supply pipe, with the result that during the operation or working of the tool the oil will be supplied thereto continuously and in the best form for proper lubrication, that is, in suspension in the air.

Figure 1:
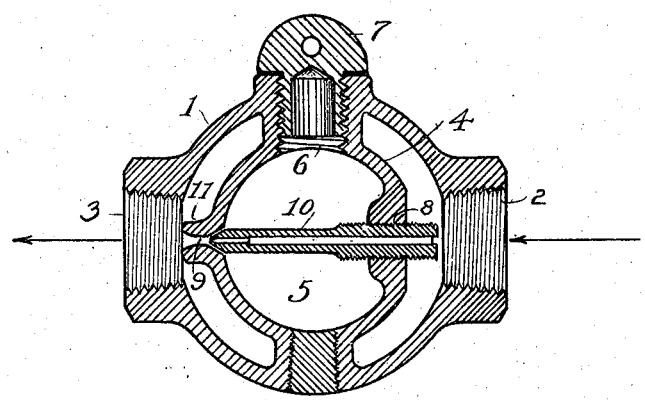
Figure 2:
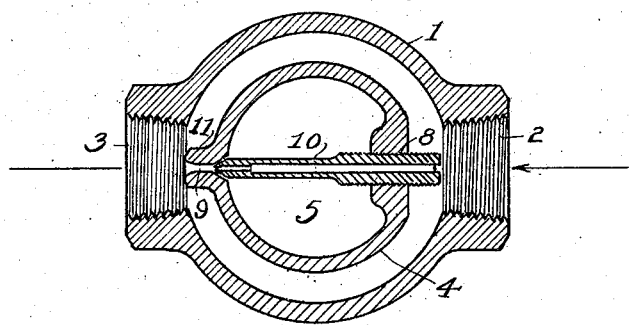

In the drawings, Figure 1 is a vertical section of my lubricator; and Fig. 2 a horizontal section thereof.

As herein shown, my lubricator comprises a body or casing 1 of globular or spherical form and arranged to be interposed at any suitable or desired point in the air supply pipe or hose (not shown) and therefore between the tool and the source of air supply. This casing is therefore provided with inlet and outlet connections or nozzles 2 and 3 respectively, for connection with two portions or ends of the supply pipe or hose.

Within the casing and centrally thereof is formed or arranged an inner shell or casing 4 constituting an oil reservoir or chamber 5. This inner shell is preferably substantially spherical and arranged concentrically of the outer casing. By preference, these two casings 1 and 4 are cast in one piece and are therefore integral, the inner casing being in the present instance joined with the outer one at two points diametrically opposed. The remainder of the annular space between the two casings affords sufficient space for the flow of the motive fluid. Access for filling the oil reservoir is had through the top opening 6 which is closed by the screw plug 7.

The oil chamber has two diametrically opposed openings 8 and 9 arranged axially of the two nozzles 2 and 3, the former one of which is screw-threaded to receive one end of the injector tube 10. The other end of this tube is substantially conical and projects slightly into the opening 9 which is extended to form an injector passage and orifice by means of the annular lip 11. The arrangement of the parts is such that an annular space is formed between the opening 9 and the end of the tube to permit the oil to pass from the reservoir in a manner hereinafter explained. The size of this annular space is determined or adjusted in the present instance by screwing the tube in or out with the result that the injector end of the tube is brought closer to or farther away from the sides of the opening 9.

From the foregoing description and an inspection of the drawing, it will be understood that the great volume of the pressure or motive fluid required for the working of the tool flows around the oil reservoir but that a small amount of such pressure flows straightway from nozzle to nozzle through the tube 10 inasmuch as the injector passage is in the direct line of flow of the motive fluid but restricted as compared with the flow of the main body of the motive fluid, with the result that the oil in the reservoir is drawn therefrom and forced by the jet from the tube through the injector passage. The oil is not only thus drawn from the reservoir but, by the action of the jet, is sprayed or atomized in the main body of air flowing to the tool for operating it. Consequently the oil in this suspended and finely divided or globular condition is carried to the working parts of the tool for lubricating them. The amount of oil thus supplied is regulated or governed by adjusting the injector tube in or out, to permit a greater or less amount of oil to be drawn from the reservoir in the manner explained.

By the employment of my lubricating device, the oil may be supplied continuously and automatically so long as the tool is working, that is, so long as motive fluid is flowing through the supply pipe or hose on its way to the tool to operate it. In this manner the supply of oil is entirely under the control of the motive fluid which draws the oil from the reservoir and conveys it in suspended condition to the tool, with the result that the working parts of such tool are lubricated properly and to any degree as determined by the operator.

I claim:

1. In a device of the class described, the combination of a casing arranged to be interposed in a supply pipe for conveying motive fluid to a tool or the like and forming a part of the motive fluid conduit, and an oil reservoir arranged within the casing, and having an injector coöperating therewith and operated by the motive fluid.

2. In a device of the class described, the combination of a casing arranged to be interposed in a supply pipe for conveying motive fluid to a tool or the like and forming a part of the motive fluid conduit, and an inner shell arranged within the said casing and constituting an oil reservoir having an injector coöperating with said reservoir and receiving its operating pressure from the said motive fluid.

3. In a device of the class described, the combination of a casing arranged to be interposed in a supply pipe for conveying motive fluid to a tool or the like, and an inner shell arranged concentrically within said casing and having an injector coöperating with said reservoir and receiving its operating pressure from the said motive fluid.

4. In a device of the class described, the combination of a casing arranged to be interposed in a supply pipe for conveying motive fluid to a tool or the like, and an inner shell arranged concentrically within said casing and secured thereto, leaving a substantially annular space between said shell and casing for the free flow of the main body of the motive fluid, said inner shell having an injector coöperating with said reservoir and receiving its operating pressure from the motive fluid.

5. In a device of the class described, the combination of a casing arranged to be interposed in a supply pipe for conveying motive fluid to a tool or the like and forming a part of the motive fluid conduit, and an inner shell arranged within said casing and constituting an oil reservoir having an injector extending across the reservoir and coöperating therewith and receiving its operating pressure from the motive fluid.

6. In a device of the class described, the combination of a casing arranged to be interposed in a supply pipe for conveying motive fluid to a tool or the like, and an inner shell arranged within said casing and constituting an oil reservoir having an injector extending across the reservoir in the direct line of flow of the motive fluid and coöperating with the reservoir to feed oil to the motive fluid.

7. In a device of the class described, the combination of a casing arranged to be interposed in a supply pipe for conveying motive fluid to a tool or the like, and an inner shell arranged within said casing and constituting an oil reservoir provided with two diametrically opposite openings, and a tube secured in one of said openings and coöperating with the other opening to form an injector for supplying oil to the motive fluid.

8. In a device of the class described, the combination of a casing arranged to be interposed in a supply pipe for conveying motive fluid to a tool or the like and forming a part of the motive fluid conduit, and an inner shell arranged within said casing and constituting an oil reservoir having an adjustable injector coöperating with said reservoir and with the motive fluid for supplying such motive fluid with oil.

9. In a device of the class described, the combination of a casing arranged to be interposed in a supply pipe for conveying motive fluid to a tool or the like, and an inner shell arranged within said casing and constituting an oil reservoir having an injector supported by and adjustable in said shell and coöperating therewith and with the motive fluid for supplying such motive fluid with oil.

10. In a device of the class described, the combination of a casing arranged to be interposed in a supply pipe for conveying motive fluid to a tool or the like, and an inner shell arranged within said casing and constituting an oil reservoir provided with an opening 8 and an injector opening 9, and also with a charging opening 6, and having an injector 10 supported at one end in opening 8 and coöperating at its other end with the injector opening.

11. In a device of the class described, the combination of a casing arranged to be interposed in a supply pipe for conveying motive fluid to a tool or the like, an inner shell arranged within said casing and constituting an oil reservoir provided with a screw-threaded opening 8 and an injector opening 9, and with a charging opening 6, and an injector tube 10 at one end screwing into and adjustable in the opening 8 and at its other end coöperating with the injector opening.

12. In a device of the class described, the combination of a casing arranged to be interposed in a supply pipe for conveying motive fluid to a tool or the like, an inner shell within said casing and constituting an oil reservoir provided with openings 8 and 9 and with an annular lip 11 around the opening 9 to form an injector passage, and an injector tube supported in opening 8 and coöperating with the injector opening.

13. In a device of the class described, the combination of a casing arranged to be interposed in a supply pipe for conveying motive fluid to a tool or the like, such casing being substantially spherical and having inlet and outlet nozzles, a substantially spherical shell arranged within and concentric of said casing, and an injector extending diametrically of said shell in axial alinement with the nozzles and coöperating with said shell which serves as an oil reservoir.

WILLIAM O. DUNTLEY.

Witnesses:
S. W. PRINCE,
W. B. SEELIG.